April 4, 1967   P. W. McCONNAUGHEY   3,312,527
CARBON MONOXIDE DETERMINATION
Filed July 5, 1963
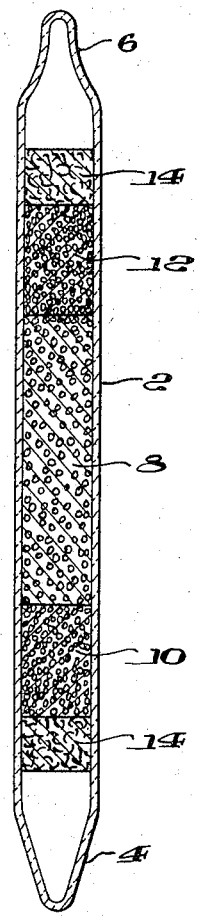
INVENTOR.
PAUL W. McCONNAUGHEY.
BY Ronald H Shakely
his ATTORNEY.

3,312,527
CARBON MONOXIDE DETERMINATION
Paul W. McConnaughey, Pittsburgh, Pa., assignor to Mine Safety Appliances Company, Pittsburgh, Pa., a corporation of Pennsylvania
Filed July 5, 1963, Ser. No. 292,937
5 Claims. (Cl. 23—254)

This invention relates to the colorimetric determination of carbon monoxide and more particularly to the prevention of false or erroneous color development in colorimetric indicators for carbon monoxide.

Carbon monoxide has been qualitatively and quantitatively determined by passing the gas to be tested through an elongated bed of granular colorimetric indicator contained in a transparent tube, thereby developing a color change or stain that progresses along the length of the bed, the length of stain depending on the concentration of CO in the gas and the volume of gas passed through the tube. Colorimetric indicators used for such analysis consist of an absorbent carrier impregnated with a reagent that changes color on reaction with CO, such as alkali metal palladosulfites disclosed in U.S. Patent 2,569,895 and palladium sulfate-ammonium molybdate reagent disclosed in U.S. Patent 2,487,077. Commonly, the elongate bed of indicator is contained in a sealed transparent tube between layers of absorbent, such as silica gel or alumina gel, that absorb and prevent interfering gases, such as water vapor, hydrocarbons or organic vapors, from reaching the indicator when in use. When using these indicator tubes, the ends are opened or broken off and the tube is connected to a pump or aspirator that forces a predetermined volume of sampled gas through the tube.

Frequently a narrow band of color develops on one or both ends of the indicator bed in the sealed tube after storage of a few hours or days. This results in erroneous indications of CO concentration when used and creates uncertainty regarding the reliability of the indicator. Since these tubes are primarily used for determining CO in air with the objective of protecting personnel from injurious exposure to carbon monoxide, inaccuracy and unreliability cannot be tolerated. Thus, in practice, indicator tubes showing the false stain are discarded.

I have found that the false color development is caused by small amounts of carbon monoxide contained in the atmosphere entrapped within the tube when sealing it. This carbon monoxide diffuses slowly through the protective gel to the indicator, resulting in a delayed color development. Ordinary air, especially in industrialized areas, may contain sufficient carbon monoxide to cause false color development in sensitive indicator tubes. The common and most economical method of making widely used glass tube indicators involve sealing the tube in a gas flame, thus there is an especially high concentration of carbon monoxide from the flame in the immediate vicinity of the tube. Although the contamination of entrapped atmosphere with CO can be avoided by manufacturing in controlled atmosphere rooms and by using means other than flame for sealing, such as electric heating, this type of operation is much more costly.

It is therefore an object of this invention to provide a protective composition for the indicator that will prevent passage of carbon monoxide by diffusion but will not absorb any significant amount of CO from a flowing stream. Another object is to provide a colorimetric indicator tube for determining carbon monoxide that does not develop a false color indication in storage. Other objects will be apparent from the following description.

According to my invention, the protective composition for a colorimetric carbon monoxide indicator consists essentially of an intimate mixture containing from about 97 to 99¾% conventional granular absorbent for interfering gases and from about ¼–3% granular absorbent for carbon monoxide. Indicator tubes according to this invention have an elongate bed of indicator disposed within a sealed transparent tube and a bed of protective composition disposed between the indicator and unfilled space adjacent sealed tube ends that may contain atmosphere contaminated wtih carbon monoxide. Sufficient protective composition is used to absorb all of the carbon monoxide that is entrapped in such unfilled space. Generally we have found that an amount of protective composition having a carbon monoxide absorbing capacity between about 0.2 and 2% of the absorbing capacity of the indicator is sufficient and preferred, although larger amounts of protective composition can be used without detriment, such as an amount having three to four times the preferred absorbing capacity.

The accompanying drawings illustrates in section an indicator tube in accordance with and incorporating the protective composition of this invention. The glass tube 2, having sealed frangible ends 4 and 6 contains a central elongate bed of colorimetric indicator 8. Layers of protective composition 10 and 12 are disposed on each side of the colorimetric indicator, all of which is held in place in the tube by porous plugs 14 of glass wool or the like. In manufacture of the tubes, conveniently end 4 is sealed and the tube is filled from the opposite end. A number of tubes are so filled, placed in supporting racks, and the ends 6 are sealed by gas flame. When the filling is done in an atmosphere that does not contain sufficient carbon monoxide to cause a false stain, no carbon monoxide is entrapped in end 4, so layer 10 may be a conventional guard gel, if desired.

Although any carbon monoxide absorbent may be used in my protective composition, it is preferred to use as an absorbent the same indicator that is used for determining carbon monoxide. This is especially convenient as this absorbent is at hand and the absorbing capacity of the protective composition relative to that of the indicator is a simple weight ratio.

To illustrate my invention, numerous carbon monoxide indicator tubes were made as described above using a 5 mm. I.D. glass tube and an indicator made in accordance with U.S. Patent 2,569,895 consisting of silica gel impregnated with potassium palladium sulfite. A 40 mm. long bed of indicator was disposed within the tube between 15 mm. long beds of protective composition containing 98% silica gel and 2% of the said indicator. None of the tubes so prepared showed any false color development on storage; indicator tubes made under identical procedures but containing protective layers of silica gel only, in place of my protective composition, showed false color development in a few hours or days. The length of stain developed for various predetermined amounts of carbon monoxide in indicator tubes containing my protective chemical are identical to that developed in indicator tubes containing conventional silica gel protective layers made under controlled carbon monoxide-free conditions. For example, in testing a 500 cc. air sample containing 10 p.p.m. CO, an identical 2 mm. stain developed in tubes containing my protective composition and in tubes containing pure silica gel protective layers.

According to the patent statutes, I have explained the principle and mode of practicing my invention and have described what I now consider to be its best embodiment. However, I desire to have it understood that, within the scope of the appended claims, the invention may be practiced otherwise than as specifically described.

I claim:
1. A device for the determination of carbon monoxide comprising a transparent sealed tube with breakable ends, an elongate bed of colorimetric indicator for carbon monoxide disposed between layers of a protective composition within said tube, at least one said layer consisting essentially of an intimate mixture of granular absorbent for interfering gases and granular absorbent for carbon monoxide containing between about ¼ and 3% of said carbon monoxide absorbent, the carbon monoxide absorbing capacity of said at least one layer being between about 0.2 and 8% of the carbon monoxide absorbing capacity of said elongate bed.

2. A device according to claim 1 in which the carbon monoxide absorbing capacity of the protective layer is less than about 2% of the absorbing capacity of the elongate bed.

3. A device for the determination of carbon monoxide comprising a transparent sealed tube with breakable ends, an elongate bed of colorimetric indicator for carbon monoxide disposed between layers of protective composition within said tube, at least one said layer of protective composition consisting essentially of an intimate mixture of silica gel and said colorimetric indicator for carbon monoxide, said mixture containing between about ¼ to 3% of said indicator, the carbon monoxide absorbing capacity of said at least one protective layer being between about 0.2 and 8% of the carbon monoxide absorbing capacity of said elongate bed.

4. A device according to claim 3 in which the colorimetric indicator consists essentially of silica gel impregnated with an alkali metal palladosulfite.

5. A device according to claim 4 in which the carbon monoxide absorbing capacity of the protective layer is less than about 2% of the carbon monoxide absorbing capacity of the elongate bed.

References Cited by the Examiner
UNITED STATES PATENTS 2,487,077   11/1949   Shepherd _____ 23—232
2,569,895   10/1951   Main-Smith et al. _____ 23—232

MORRIS O. WOLK, *Primary Examiner.*

Z. PAROCZAY, R. M. REESE, *Assistant Examiners.*